US009286175B2

(12) United States Patent
Samanta et al.

(10) Patent No.: US 9,286,175 B2
(45) Date of Patent: Mar. 15, 2016

(54) SYSTEM AND METHOD OF WRITE HOLE PROTECTION FOR A MULTIPLE-NODE STORAGE CLUSTER

(71) Applicant: LSI Corporation, San Jose, CA (US)

(72) Inventors: Sumanesh Samanta, Bangalore (IN); Horia Cristian Simionescu, Foster City, CA (US); Luca Bert, Cumming, GA (US); Debal Kr. Mridha, Bangalore (IN); Mohana Rao Goli, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 14/091,397

(22) Filed: Nov. 27, 2013

(65) Prior Publication Data

US 2015/0135006 A1    May 14, 2015

(30) Foreign Application Priority Data

Nov. 8, 2013   (IN) .............................. 1274KOL2013

(51) Int. Cl.
*G06F 11/00* (2006.01)
*G06F 11/20* (2006.01)
*G06F 11/10* (2006.01)
*G06F 3/06* (2006.01)
*G06F 11/16* (2006.01)

(52) U.S. Cl.
CPC .............. *G06F 11/2094* (2013.01); *G06F 3/06* (2013.01); *G06F 11/1076* (2013.01); *G06F 11/2064* (2013.01); *G06F 11/1662* (2013.01); *G06F 2201/82* (2013.01)

(58) Field of Classification Search
CPC ............ G06F 11/1076; G06F 11/2064; G06F 2211/1059
See application file for complete search history.

(56) References Cited

U.S. PATENT DOCUMENTS

| | | | |
|---|---|---|---|
| 5,835,955 A | 11/1998 | Dornier et al. | |
| 6,067,635 A * | 5/2000 | DeKoning et al. | ........... 714/6.21 |
| 7,536,586 B2 | 5/2009 | Ahmadian et al. | |
| 7,779,294 B2 * | 8/2010 | Corrado et al. | .............. 714/6.22 |
| 8,255,739 B1 | 8/2012 | Chaterjee et al. | |
| 2004/0095666 A1 * | 5/2004 | Asano et al. | ..................... 360/53 |
| 2010/0031262 A1 * | 2/2010 | Baird-Gent | ................... 718/102 |

* cited by examiner

*Primary Examiner* — Charles Ehne

(57) ABSTRACT

The disclosure is directed to preserving data consistency in a multiple-node data storage system. According to various embodiments, a write log is maintained including log entries for data transfer requests being served by a respective node of the multiple-node data storage system. Rather than maintaining a full write journal of data and parity associated with each data transfer request, the log entries only need to identify portions of the virtual volume being updated according to the data transfer requests served by each node. When a first node fails, a second node takes over administration of a virtual volume for the failed node. Upon taking over for the first (failed) node, the second node resolves any inconsistencies between data and parity in portions of the virtual volume identified the respective log entries. Accordingly, write holes are prevented without substantially increasing memory usage or system complexity.

20 Claims, 5 Drawing Sheets

SYSTEM AND METHOD OF WRITE HOLE PROTECTION FOR A MULTIPLE-NODE STORAGE CLUSTER

PRIORITY

The present application claims priority under 35 U.S.C. 119(a) to Indian Patent Application Serial No. 1274/KOL/2013, entitled SYSTEM AND METHOD OF WRITE HOLE PROTECTION FOR A MULTIPLE-NODE STORAGE CLUSTER, By Sumanesh Samanta et al., filed Nov. 8, 2013, which is currently co-pending, or is an application of which a currently co-pending application is entitled to the benefit of the filing date.

FIELD OF INVENTION

The disclosure relates to the field of data storage systems and devices.

BACKGROUND

While redundant array of independent disks (RAID) systems provide data protection against disk failure, direct attached storage (DAS) RAID controllers are vulnerable to server failure. Since a DAS RAID controller is typically embedded inside a respective server, the controller inevitably fails or is disabled when the server fails. Multiple-node or multiple-server high availability (HA) DAS RAID configurations can be used to provide additional protection against server failure.

In multiple-node data storage systems, when one node or server fails, another server takes over the virtual volume that was being served by the failed server. However, the new server typically lacks information about whether or not the last write operation was successfully completed by the failed server. In cases where the last write operation was not completed by the failed server, an inconsistency (sometimes referred to as a "write hole") occurs when data and parity for the respective operation are only partially updated (e.g. new data+old parity). Data corruption can result if the new server starts processing new data transfer (IO) requests while the array is in an inconsistent state.

SUMMARY

Various embodiments of the disclosure include a system and method for preserving data consistency in multiple-node data storage systems. Upon receiving a data transfer request including a request to store at least one data segment and at least one parity segment to a virtual volume defined by at least one storage device, a log entry identifying a portion of the virtual volume associated with the data transfer request is stored in a write log. When a first node fails and a second node takes over for the failed node, the second node resolves any inconsistency between data and parity stored on the virtual volume by the first (failed) node for portions of the virtual volume identified by the respective log entries of the first node. The second node continues serving data transfer requests for portions of virtual volume that are identified by the log entries after resolving the inconsistencies.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
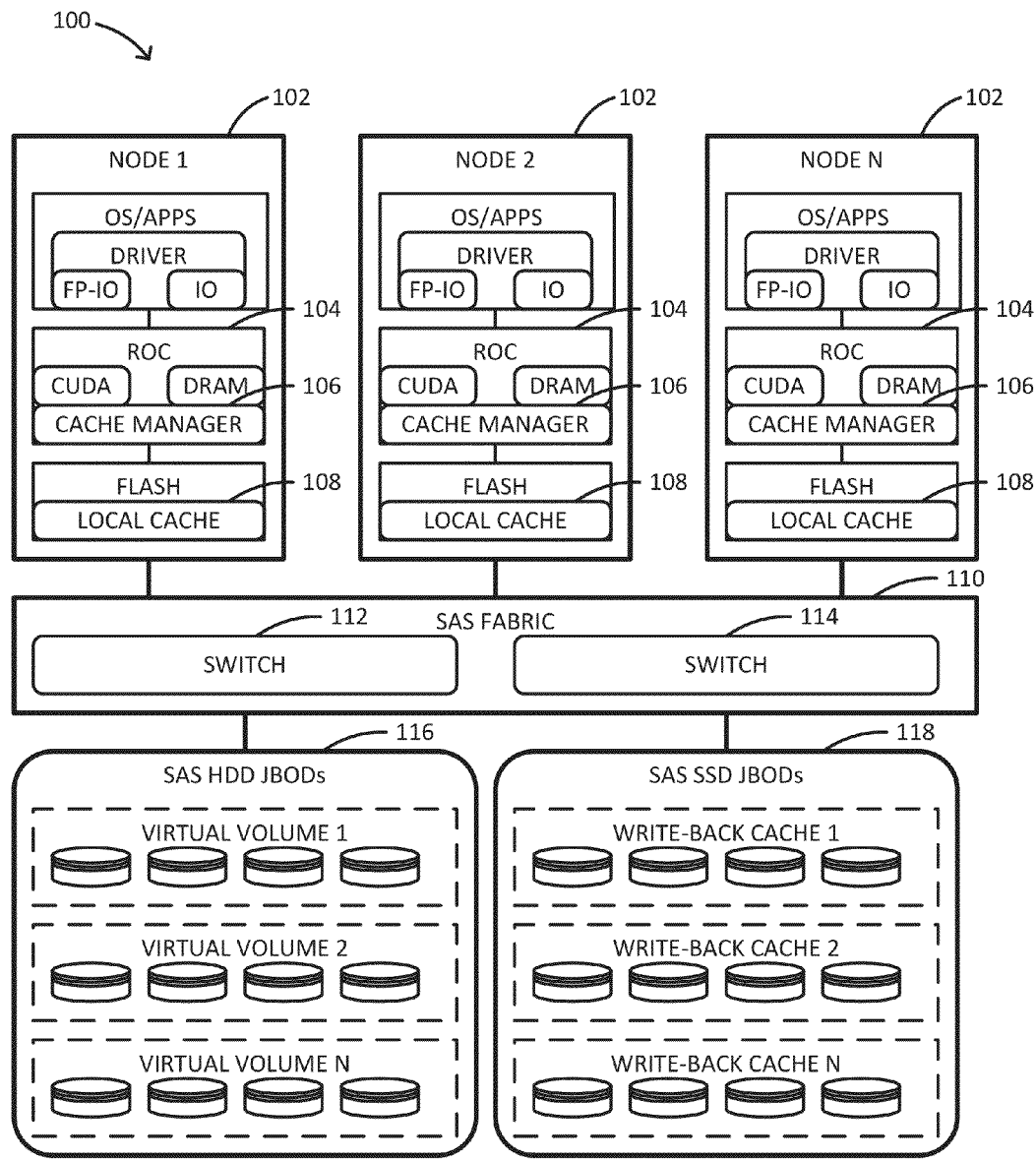
FIG. 1 is a block diagram illustrating a multiple-node storage system, in accordance with an embodiment of the disclosure.

FIG. 1 illustrates an embodiment of a multiple-node storage system 100. The system 100 includes at least one storage cluster 116, such as a high availability (HA) storage cluster or just a bunch of disks (JBOD) complex, accessible by a plurality of nodes 102, such as servers. Each node 102 includes at least one controller 104 such as, but not limited to, a RAID controller, RAID on Chip (ROC) controller, or at least one single-core or multiple-core processor. The respective controller 104 of each node 102 is configured to transfer data to or from logical block address regions or "windows" of virtual volumes defined across a plurality of storage devices, such as hard disk drives (HDDs) or solid-state disk (SSD) drives, making up the storage cluster 116. The nodes 102 are communicatively coupled to the storage cluster 116 by at least one switch 112, such as a serial attached SCSI (SAS) switch. In some embodiments, the nodes 102 are communicatively coupled to respective virtual volumes of the storage cluster 116.

According to various embodiments, each node 102 includes or is communicatively coupled to at least one respective storage device 108 configured to store local cache memory. In some embodiments, the local storage device 108 includes a SSD drive. The cache memory 108 is configured to aid data transfers between the respective node 102 and cached regions of the storage cluster 116 for low latency data transfers and increased 10 operations per second (IOPs). In some embodiments, the local storage device 108 is onboard the controller 104 or coupled directly to the respective node 102, thus sharing the same power domain.

A local cache manager 106 in communication with the local cache memory 108 is configured to manage cache data and cache metadata stored in the local cache memory 108. In some embodiments, the cache manager 106 includes at least one dedicated processor or controller configured to manage the cache memory 108 for a respective node 102 according to program instructions executed from at least one carrier medium. In some embodiments, the cache manager 106 is embodied by a software or firmware module running on the controller 104 or a processor of the respective node 102.

In some embodiments, the system 100 further includes a second shared storage cluster 118 configured to store dirty write-back cache data. Storing the dirty write-back cache in the shared second store cluster 118 enables takeover of dirty data by a second node 102 when a first node 102 fails. References herein to a "first node" and a "second node" are not restrictive to a particular order, number, or arrangement of nodes 102. The terms "first" and "second" are used to facilitate readability of the disclosure by distinguishing one element from another. In some embodiments, the nodes 102 are further coupled to the second storage cluster 118 by at least a second switch 114. In some embodiments, the first switch 112 and the second switch 114 are coupled by SAS fabric 110. In some embodiments, the SAS fabric 110 is controlled by an ROC fabric manager accessible by at least one host node 102. In some embodiments, host nodes 102 include at least one processor running a computing program, such as WINDOWS SERVER or VMWARE CLUSTER SERVER, configured to provide planned or unplanned failover service to applications or Guest OS.

Figure 2:
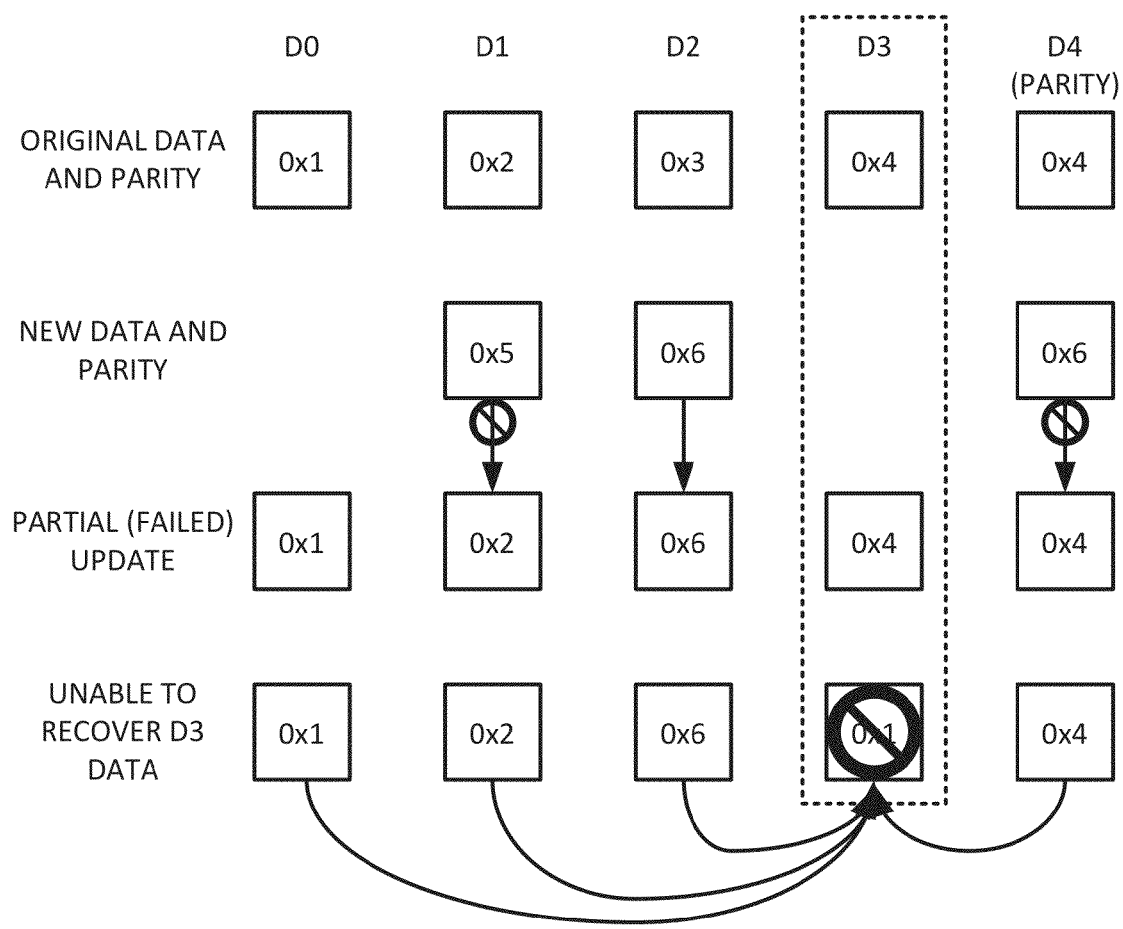
FIG. 2 illustrates an array of data and parity, wherein the array is only partially updated as a result of a node failure, in accordance with an embodiment of the disclosure.

FIG. 2 illustrates a portion of a virtual volume defined across a plurality of drives (D0 through D4), where one or more data segments are stored in D0 through D3 and at least one parity segment is stored in D4. As shown in FIG. 2, an inconsistency between data and parity (i.e. a write hole) can occur when a server fails while processing a data transfer request, such as a write operation. For RAID 5 and RAID 6 configurations, when a write operation is processed at least two drives need to be updated—at least one drive (e.g. D1 or D2) storing one or more data segments and at least one drive (e.g. D4) storing one or more parity segments. In some embodiments, such as in RAID 6 configurations, at least three drives need to be updated, data and P, Q parity. A sudden power failure or another failure event causing the respective node 102 to fail or become disabled will sometimes result in one of data or parity being updated while the other is not. The partial (i.e. failed) update leads to inconsistency (e.g. new data, old parity) in the data stripe or portion of the virtual volume. If another drive (e.g. D3) fails, then data for the failed drive will be reconstructed from inconsistent data or parity, resulting in data corruption.

Write hole protection may be implemented by maintaining a write journal. Prior to writing data and parity to the respective virtual volume, a copy is saved in some persistent or battery backed memory (e.g. DDR) location. After the system restarts, the data and parity segments are written back to the respective portion of the virtual volume from the write journal. For a single-node standalone system, the write journal is typically maintained in a battery or supercapacitor backed DDR memory. However, for the multiple-node storage system 100, when one node 102 fails, a second node 102 takes over administration of the virtual volume previously being served by the first (failed) node 102. The second node 102 lacks information when a recent write operation is not completed by the first node 102 before failing, thus creating an inconsistency.

If the second node 102 starts processing IO requests while the array is in an inconsistent state, data corruption can result as illustrated in FIG. 2 and discussed above. In a two-node HA storage system a write journal can be mirrored between two nodes. When a first node fails, the second node can replay the write journal upon taking over for the first node to protect against a write hole and data corruption. The problem of mirroring a write journal between nodes is that it is generally limited to two-node architectures. An n-node HA clusters should be able to withstand n−1 node failures. If a write journal is mirrored in only two nodes, and those two nodes fail, the write hole problem reemerges. Further, mirroring a write journal in more than two nodes is very time consuming, will significantly degrade performance, and wastes DDR memory in all n nodes. Maintaining a write journal requires saving both data and parity for at least the pending write operations. Depending on the size of a data stripe, a significant amount of memory can be taken up by the write journal. For example, for 1 megabyte (MB) stripe size and RAID 6 configuration, 3 MB (1 MB data+2 MB parity) of memory must be mirrored between two servers for every write operation. Aside from the wasted memory, mirroring the data for each write operation is time consuming and, therefore, imposes a significant burden on performance.

Figure 3A:
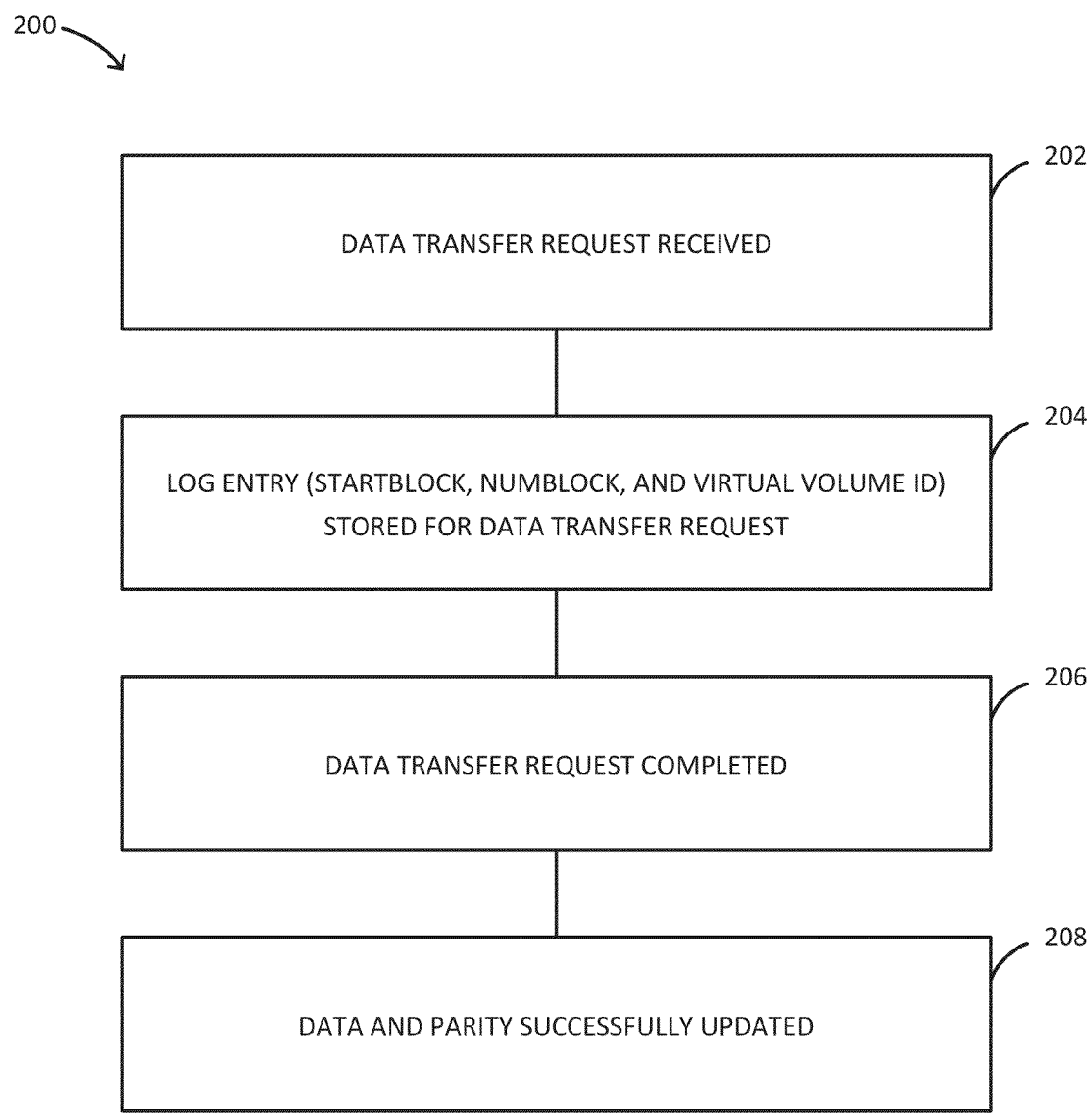
FIG. 3A is a flow diagram illustrating a method of preserving data consistency, in accordance with an embodiment of the disclosure.
Figure 3B:
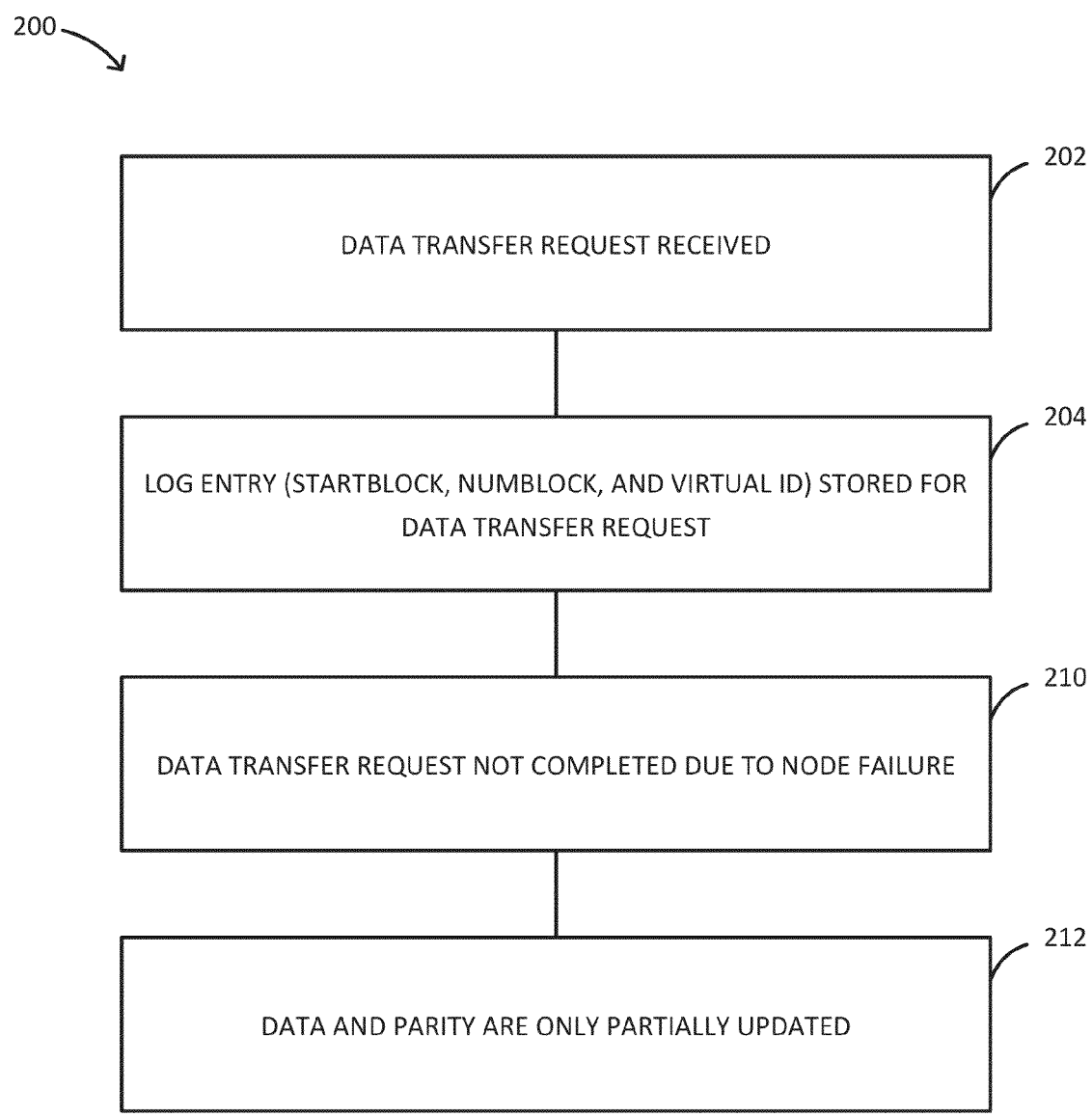
FIG. 3B is a flow diagram illustrating a method of preserving data consistency, in accordance with an embodiment of the disclosure.
Figure 3C:
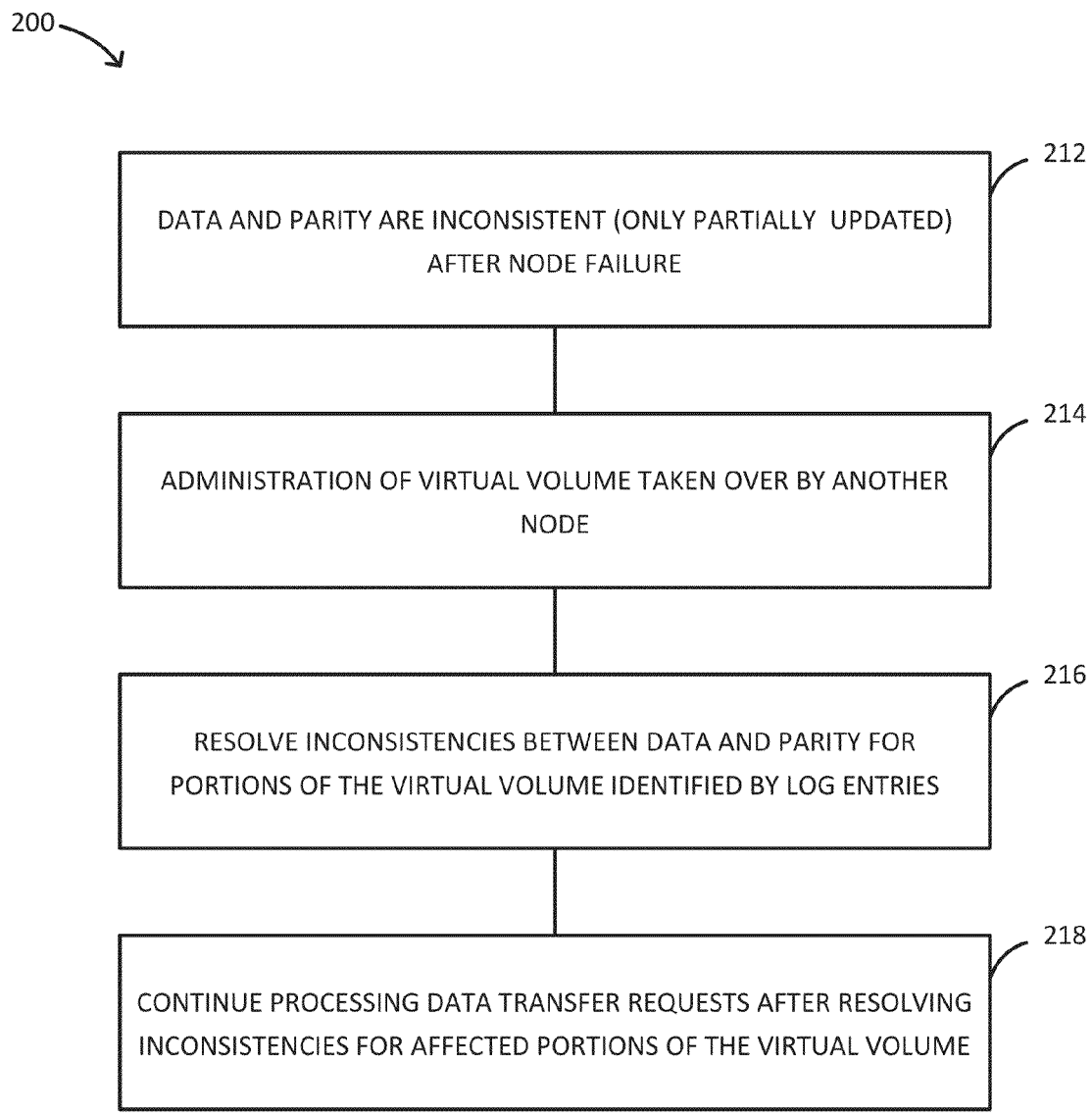
FIG. 3C is a flow diagram illustrating a method of preserving data consistency, in accordance with an embodiment of the disclosure.

FIGS. 3A through 3C illustrate a method 300 of preserving data consistency without needing to mirror data and parity for every write operation processed at each node 102. To maintain a write journal, the new data and parity for each write operation are kept and written back to the virtual volume when needed. As such, a respective data stripe always has new data and parity or old data and parity (i.e. if the respective node failed before the journal entry was created). Method 300 takes advantage of the concept that, as long as the row is consistent (i.e. data and parity are consistent), there is no need to maintain fine granularity of either old data-old parity or new data-new parity. Since the last write is not acknowledged in the upper layer, it is acceptable to have data on the disk that is partially updated (i.e. mixture of old and new data) as long as the parity reflects the data on the disk.

Method 300 takes advantage of the foregoing concept and maintains a write log referencing a block address and range of a respective virtual volume instead of a full write journal of data and parity. In some embodiments, a log entry including a start address (startBlock), a range of the virtual volume (numBlock), and a virtual volume identifier (Virtual Volume ID) is kept for every write operation for a respective node 102. Each log entry is as small as a few bytes of information instead of the MBs worth of data that a full write journal entry would require. The log entries are stored in a shared memory location that is accessible by the plurality of nodes 102, such as a shared SSD or random access memory (e.g. DRAM) of a shared controller. Accordingly, any of the active nodes 102 are enabled to take over for a failed node 102 and make consistent any portions of the virtual volume that were only partially updated when a failure event occurred.

For degraded RAID 5 or RAID 6, where one or more drives have already failed, data for the missing arms are stored along with the respective log entries. The data of the missing arm can be reconstructed with ease using RAID logic. Although saving data for the missing arms adds to the amount of data that needs to be logged there are still significant advantages over maintaining a full write journal. Even for degraded RAID, there is only a need to store additional information of one or more missing arms. This additional information is still less than the amount of data (i.e. data and parity) that needs to be stored for a full write journal. Degraded RAID is already an error condition so affecting performance by storing additional information is less important during degraded RAID. Moreover, degraded RAID is a temporary condition, and upon recovery, the system can be switched back to keeping simple write log entries.

In some embodiments, the method 300 is embodied in a multiple-node data storage system, such as system 100. As such, the method 300 includes all steps necessary to perform any functions or operations described with regard to system 100. Further, in some embodiments, the steps of method 300 are carried out by one or more components of system 100, such as one or more respective controllers 104 or processors of the nodes 102. Method 300 is not necessarily limited to system 100. In some embodiments, method 300 is embodied in a single-node standalone computing system as an alternative to maintaining a write journal. Those skilled in the art will appreciate the advantages and applicability of method 300 in a variety of computing and data storage system architectures. Embodiments of method 300 should be understood to encompass any system configured to perform one or more of the following steps or operations.

Looking now to FIG. 3A, at step 202, a data transfer request is received by a first node 102. In some embodiments, the data transfer request includes a request to store data to a portion of a first virtual volume associated with the first node 102. Prior to completing the write operation, at step 204, a log entry associated with the data transfer request is stored in a write log. In some embodiments, the log entry identifies the respective portion of the virtual volume (e.g. startBLOCK, numBLOCK, Virtual Volume ID). In some embodiments, the write log is maintained in the second shared storage cluster 118 used to write-back cache for the plurality of nodes 102, or a memory (e.g. DDR memory) location on the SAS fabric 110, such as a memory of a switch 112 or 114 or a memory of the fabric manager controller. The write log is stored in a memory location (e.g. shared DDR or SSD memory) accessible by the plurality of nodes 102 so that when a first node 102 fails, a second node 102 is enabled to access the log entries of the first node 102.

In some embodiments, the write log includes a respective circular queue buffer for each node 102 storing the respective log entries of each node 102. The circular queue buffer for each node 102 is configured to store at least as many log entries as the number of write operations that can be pending from the respective controller 104 of the node 102 at any given time. In some embodiments, the respective circular queue buffer of a node 102 is configured to store a number of log entries in the range of approximately 512 to 1024 log entries.

At steps 206 and 208, after storing the respective log entry in the write log, the first node 102 completes the data transfer request by updating at least one data segment and at least one parity segment according to the write operation. As shown in FIG. 3B, after storing the respective log entry in the write log, the method 300 will traverse from step 204 to step 210 when a failure event prevents the first node 102 from completing the data transfer request. Accordingly, at step 212, the data and parity might only be partially updated, which may result in data and parity inconsistency.

Looking now to FIG. 3C, at step 214 a second node 102 takes over administration of the first virtual volume when the first node 102 fails or is disabled. The second node 102 is enabled to access the log entries of the first node 102 from the write log but lacks information about whether or not data and parity has been properly updated for one or more portions of the first virtual volume. At step 216, the second node 102 resolves inconsistencies between data and parity for the respective portions of the first virtual volume. In some embodiments, the second node 102 checks the log entries and compares data and parity stored in respective portions of the first virtual volume. The second node 102 then corrects any inconsistencies; for example, parity is recalculated and rewritten for portions of the first virtual volume with inconsistent data and parity. In some embodiments, the second node 102 resolves inconsistencies (blindly) by recalculating and overwriting parity for the portions of the first virtual volume identified by the log entries. Although overwriting parity for the identified portions can result in unnecessary overwrites (i.e. when data and parity are not inconsistent, but parity is blindly overwritten), there is still likely to be an efficiency advantage from not having to locate inconsistent portions of the virtual volume by comparing data and parity. Moreover, the latter approach of blindly overwriting parity for the identified portions of the virtual volume reduces system complexity. In some embodiments, the second node 102 resolves any inconsistencies before serving IO requests for the first virtual volume. Additionally, in degraded RAID scenarios, data for one or more missing arms is kept with the log entries and used to reconstruct data and write parity as part of step 216.

At step 218, the second node processes pending IO requests for the first virtual volume after inconsistencies have been resolved for affected portions of the first virtual volume. In some embodiments, the second node is enabled to serve IO requests, before completing step 216, as long as they are not associated with the portions of the first virtual volume identified by the log entries. Otherwise, the corresponding portions must be made consistent before proceeding to serve IO requests.

As discussed above, the second node typically lacks information with regards to log entries of the first node that are associated with portions of the virtual volume at higher risk of being inconsistent due to the failure event. Accordingly, it is advantageous to perform step 216 for all log entries of the first node because performing a consistency operation on an already consistent row is not harmful in anyway. Alternatively, the log entries can be removed after every successful write operation. However, doing so will add to runtime overhead and offers little advantage.

Throughout the disclosure, write hole protection is mostly described with regard to multiple-node embodiments in a HA environment. However, method 300 is applicable in any embodiment where write journal persistence can be a problem. For example, the method 300 is applicable in a standalone system where there is no DRAM backup, and thus no way to store the write journal across power cycle. Method 300 can be extended to single-node or standalone embodiments used by storing a write log in a SSD or battery backed memory. When the system restarts after a failure event, the write log can be checked to make affected portions of a storage volume consistent before resuming 10 service. Since much less data is stored than a full write journal, there is a significant performance advantage in single-node embodiments too.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein.

Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for preserving data consistency, comprising:
a controller for at least one node of a plurality of nodes in communication with a storage cluster, the controller being configured to:
receive a data transfer request including a request to store at least one data segment and at least one parity segment to a virtual volume defined by at least a portion of the storage cluster;
store a log entry identifying a portion of the virtual volume associated with the data transfer request in a write log;
complete the data transfer request after the log entry has been stored in the write log; and
resolve an inconsistency between at least one data segment and at least one parity segment stored on the virtual volume by a failed node of the plurality of nodes, wherein the at least one data segment and the at least one parity segment stored by the failed node are associated with at least one log entry stored in the write log prior to failure of the failed node, and wherein resolving the inconsistency includes recalculating and overwriting parity in the at least one parity segment without comparing the at least one data segment and the at least one parity segment stored by the failed node.

2. The system of claim 1, wherein the controller is further configured to:
process a data transfer request after the inconsistency is resolved when the data transfer request is associated with the portion of the virtual volume identified by the at least one log entry stored in the write log prior to failure of the failed node.

3. The system of claim 1, wherein the controller is further configured to:
process a data transfer request before resolving the inconsistency when the data transfer request is associated with the portion of the virtual volume that is not identified by the at least one log entry stored in the write log prior to failure of the failed node.

4. The system of claim 1, wherein the log entry only includes a start block address, a range of blocks from the start block address, and a virtual volume identifier.

5. The system of claim 4, wherein the controller is further configured to:
store at least one data segment associated with a failed storage device in the write log with the log entry in response to an error condition resulting in failure of the failed storage device.

6. The system of claim 1, wherein the write log is stored in a shared memory location accessible by the plurality of nodes.

7. The system of claim 6, wherein the shared memory location comprises a random access memory of a controller in communication with the plurality of nodes.

8. The system of claim 6, wherein the shared memory location comprises a solid state disk drive accessible by the plurality of nodes.

9. The system of claim 6, wherein the controller is further configured to store at least M log entries for the at least one node in a respective circular queue buffer of the write log, where M is a maximum number of pending data transfer requests for the at least one node at any given time.

10. A method of preserving data consistency, comprising:
receiving a data transfer request for at least one node of a plurality of nodes in communication with a storage cluster, wherein the data transfer request includes a request to store at least one data segment and at least one parity segment to a virtual volume defined by at least a portion of the storage cluster;
storing a log entry identifying a portion of the virtual volume associated with the data transfer request in a write log;
completing the data transfer request after the log entry has been stored in the write log; and
resolving an inconsistency between at least one data segment and at least one parity segment stored on the virtual volume by a failed node of the plurality of nodes, wherein the at least one data segment and the at least one parity segment stored by the failed node are associated with at least one log entry stored in the write log prior to failure of the failed node, and wherein resolving the inconsistency includes recalculating and overwriting parity in the at least one parity segment without comparing the at least one data segment and the at least one parity segment stored by the failed node.

11. The method of claim 10, further comprising:
processing a data transfer request after the inconsistency is resolved when the data transfer request is associated with the portion of the virtual volume identified by the at least one log entry stored in the write log prior to failure of the failed node.

12. The method of claim 10, further comprising:
process a data transfer request before resolving the inconsistency when the data transfer request is associated with the portion of the virtual volume that is not identified by the at least one log entry stored in the write log prior to failure of the failed node.

13. The method of claim 10, wherein the log entry only includes a start block address, a range of blocks from the start block address, and a virtual volume identifier.

14. The method of claim 13, further comprising:
storing at least one data segment associated with a failed storage device in the write log with the log entry in response to an error condition resulting in failure of the failed storage device.

15. The method of claim 10, wherein the write log is stored in a shared memory location accessible by the plurality of nodes.

16. The method of claim 10, further comprising:
storing at least M log entries for the at least one node in a respective circular queue buffer of the write log, where M is a maximum number of pending data transfer requests for the at least one node at any given time.

17. A method of preserving data consistency, comprising:
receiving a data transfer request including a request to store at least one data segment and at least one parity segment to a virtual volume defined by at least one storage device;
storing a log entry identifying a portion of the virtual volume associated with the data transfer request in a write log; and resolving an inconsistency between at least one data segment and at least one parity segment stored on the virtual volume when successful completion of the data transfer request is prevented by a failure event, wherein the at least one data segment and the at least one parity segment stored on the virtual volume are associated with the log entry, and wherein resolving the inconsistency includes recalculating and overwriting parity in the at least one parity segment without comparing the at least one data segment and the at least one parity segment.

18. The method of claim 17, wherein the log entry is stored in the write log prior to the failure event.

19. The method of claim 17, further comprising:
processing a data transfer request after the inconsistency is resolved when the data transfer request is associated with the portion of the virtual volume identified by the log entry.

20. The method of claim 17, wherein the log entry only includes a start block address, a range of blocks from the start block address, and a virtual volume identifier.

* * * * *